United States Patent [19]
Palmieri

[11] 3,942,718
[45] Mar. 9, 1976

[54] ELECTRONIC THERMOSTAT

[75] Inventor: Joseph M. Palmieri, Deep River, Conn.

[73] Assignees: Andrew M. Esposito, Woodbridge; Joseph M. Palmieri, Deep River, both of Conn.

[22] Filed: Apr. 19, 1973

[21] Appl. No.: 352,518

[52] U.S. Cl. ............... 236/78 R; 165/26; 235/150.1; 318/641; 331/66; 73/362 R
[51] Int. Cl.² .................. G05D 23/24; G05B 19/38
[58] Field of Search ...... 236/78; 165/26; 235/150.1; 307/39; 318/641, 601; 73/362 R; 219/510; 340/227 R, 146.2; 331/66

[56] References Cited
UNITED STATES PATENTS

| | | | |
|---|---|---|---|
| 3,086,708 | 4/1963 | Berkowitz et al. | 235/154 |
| 3,377,545 | 4/1968 | Tveit | 165/26 X |
| 3,427,442 | 2/1969 | Sklaroff | 318/601 X |
| 3,559,882 | 2/1971 | Jordon | 235/151.1 |
| 3,591,077 | 7/1971 | Alton | 236/78 |
| 3,732,732 | 5/1973 | Trethewey | 73/362 R |
| 3,775,591 | 11/1973 | Gould, Jr. | 219/501 |

Primary Examiner—William E. Wayner
Attorney, Agent, or Firm—Ryder, McAulay, Fields, Fisher & Goldstein

[57] ABSTRACT

An electronic thermostat for controlling the operation of a temperature changing device such as a heater or a cooling device to maintain the temperature of an object at a desired level. The thermostat comprises a device in heat exchanging relationship with the object for generating a temperature signal representative of the temperature of the object. A reference signal generator is operable to generate a reference signal representative of the desired temperature level. A comparator compares the reference and temperature signals and produces an operate signal to operate the temperature changing device when the reference and temperature signals are unequal.

11 Claims, 3 Drawing Figures

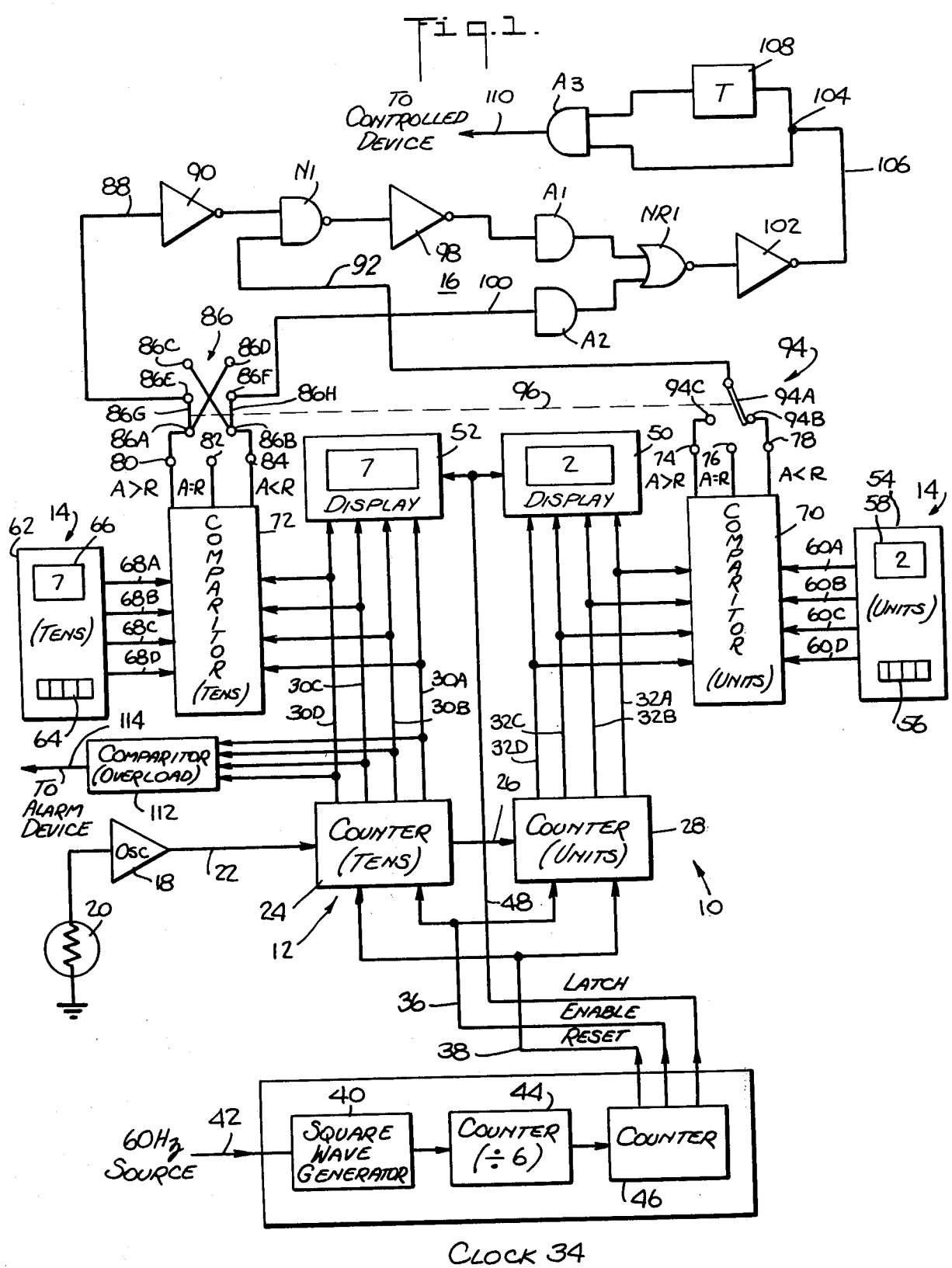

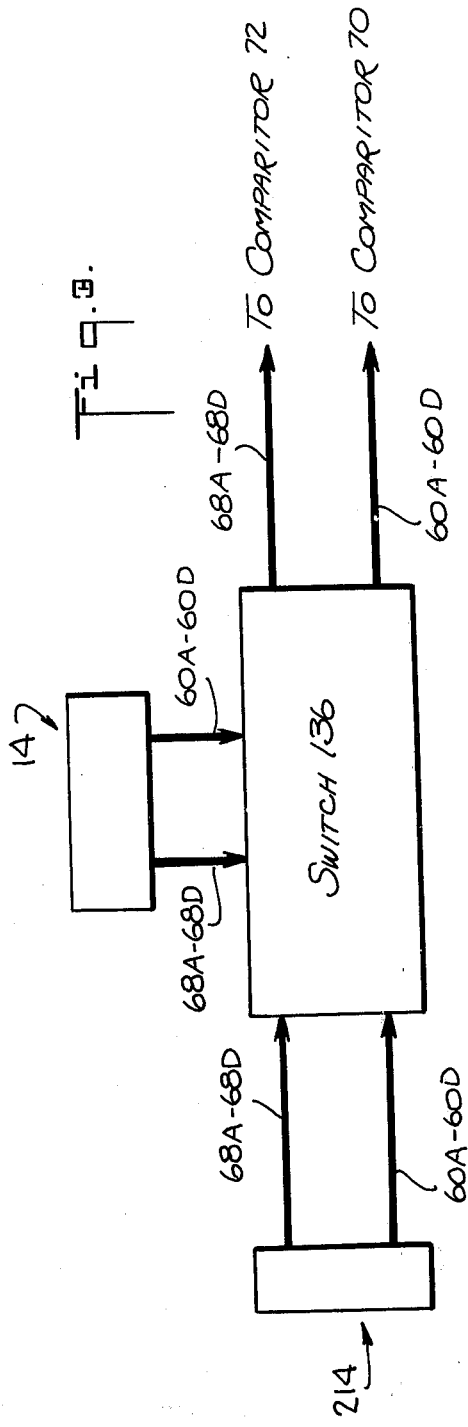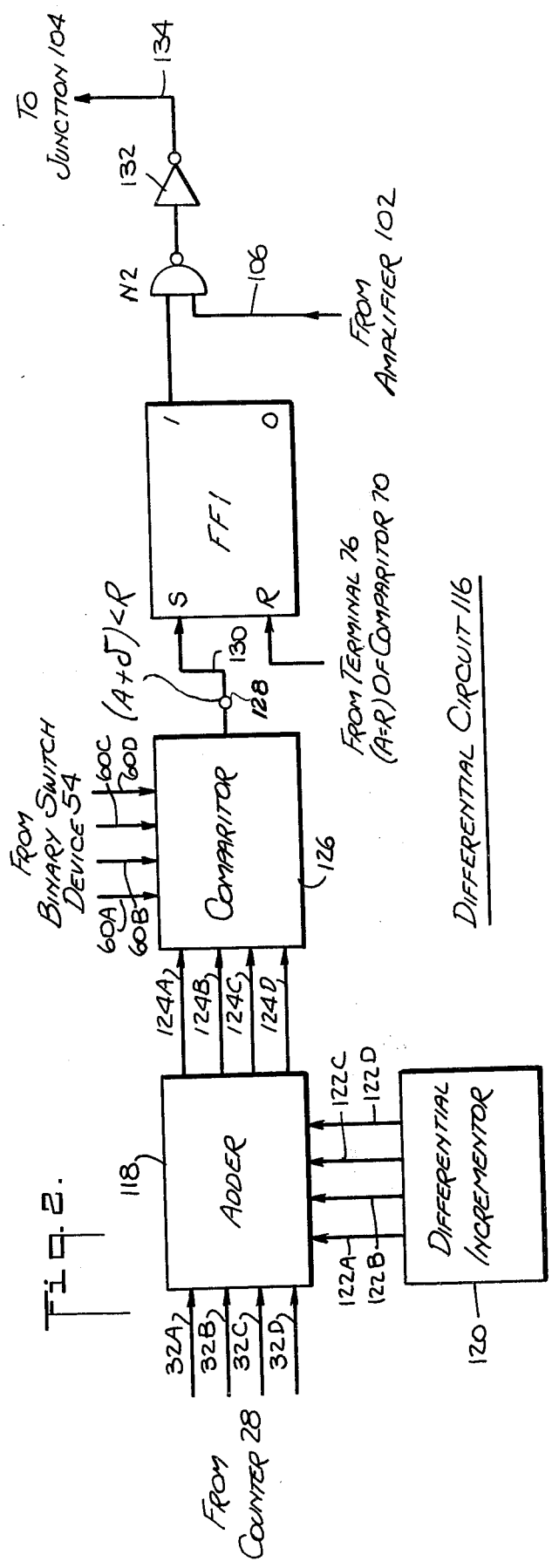

ELECTRONIC THERMOSTAT

The present invention relates generally to a thermostat for generating control signals for an associated temperature changing device and, more particularly, pertains to an accurate and reliable electronically operable thermostat.

A thermostat is utilized to maintain the temperature of an object at a desired level. For example, the conventional home thermostat is located in a room of a house and maintains the temperature of the room at a desired level by controlling the operation of a heater to heat the room to the desired temperature or by controlling the operation of a cooling device to cool the room to the desired temperature, as the case may be. Conventionally, a thermostat comprises a bimetallic strip which curls or uncurls as the ambient temperature varies. As the strip moves, a mercury switch mounted thereon similarly moves and causes contacts to be bridged by the mercury if the ambient temperature varies from the desired level by a few degrees. This action energizes the heating or cooling device thereby changing the ambient temperature until subsequent movement of the strip causes the contacts to open. While this type of thermostat has gained widespread use in both home and industry, there are severe disadvantages associated with such use.

For example, since the heart of such electromechanical thermostat is the mercury switch, it is of utmost importance that the thermostat be mounted in a specific orientation otherwise the switch will lie at an angle and produce temperature errors. As a matter of fact, most thermostats of the type under consideration must be mounted with a plumbline so that they retain their accuracy. Obviously, not only is this requirement burdensome but it is also time consuming and, consequently costly.

Another more immediate problem associated with these prior art thermostats resides in the fact that the rate of movement per degree of the bimetallic strip varies with temperature. Hence, in general, thermostats of this type do not maintain the same accuracy over their range of operation. Additionally, the constant changing of the reference temperature of the thermostat by the operator eventually causes misalignments and therefore inaccuracies occur over a period of time. Moreover, since the thermostat is electromechanical in nature, it suffers from all the other problems associated with such devices. For example, the contacts arc when the circuit is broken and normal operation requires periodic recalibration of the device.

Accordingly, an object of the present invention is to provide an improved thermostat.

A more particular object of the present invention is to provide an electronically operated thermostat.

Another object of the invention is the provision of an electronic thermostat which is highly reliable and accurate over its entire range of operation.

A further object of the invention resides in the novel details of construction which provide an electronic thermostat of the type described which can be mounted in any orientation and which maintains its accuracy regardless of changes in such orientation.

Accordingly, a thermostat or temperature control apparatus constructed in accordance with the present invention comprises temperature signal generating means responsive to the ambient temperature for producing a temperature signal representative signal representative of the ambient temperature. Reference signal generating means is provided for producing a reference signal representative of a desired temperature. Comparing means is connected to the temperature and reference signal generating means and is operable to generate an operate signal in response to an inequality between the temperature and reference signals to cause operation of an associated device such as a heater or a cooling device.

If a conventional bimetallic strip thermostat is defective, it may continuously operate the temperature changing device. If no person is present, a constantly operating furnace, for example, may cause irreparable damage to a home and its furnishings.

Accordingly, a feature of the electronic thermostat of the present invention is the provision of an overload or an alarm sensor for producing an alarm signal in response to extreme temperatures.

Other features and advantages of the present invention will become more apparent from a consideration of the following detailed description when taken in conjunction with the accompanying drawings, in which:

FIG. 1 is a schematic circuit wiring diagram, partially in block form, illustrating an electronic thermostat constructed in accordance with the present invention;

FIG. 2 is a schematic circuit wiring diagram, partially in block form, of a circuit for use in conjunction with the circuit of FIG. 1 for introducing a temperature differential of a predetermined amount prior to operation of a controlled device; and FIG. 3 is a circuit diagram, in block form, of a modification of the circuit of FIG. 1 showing the use of a plurality of reference signal generators.

An electronic thermostat constructed in accordance with the present invention is designated generally by the reference numeral 10 in FIG. 1 and is adapted to control the operation of an associated temperature changing device. Basically, the thermostat 10 is a digitally operated device which includes: a temperature signal generator section 12 that generates, in binary coded decimal form, a number representative of the ambient temperature; a reference signal generator section 14 that generates, in binary coded decimal form, a number representative of the reference temperature or desired temperature level; and a comparator section 16 for comparing the binary coded signals from the temperature signal generator section and the reference signal generator section to produce an operate signal when the binary coded signals are unequal, thereby to operate an associated temperature changing device. The temperature changing device thereupon either heats or cools the environment, as the case may be, until the ambient temperature is equal to the reference or desired temperature level.

More specifically, the temperature signal generator section 12 includes a temperature controlled oscillator 18, the frequency of which varies in proporation to variations in temperature of the object to be monitored. That is, the oscillator 18 includes a thermister 20 which is placed in heat-exchanging relationship with the object whose temperature is to be controlled. In the example under consideration, it is assumed that the temperature of a room is to be maintained at a desired level and, accordingly the thermister 20 is located in the room. (For ease of reference, the room temperature will be referred to as the "ambient" or "A" temperature.) The output terminals of the oscillator 18 are connected by a lead 22 to the input terminals of a "tens" decade counter 24. The tens counter 24 is connected by a lead 26 to a "units" decade counter 28.

The counters 24 and 28 are conventional in construction and are operable to count the frequency of the signal produced by oscillator 18 and to represent the same as a decimal number in binary coded decimal form by appropriate binary signals appearing on output leads 30A–30D of the counter 24 and output leads 32A–32D of counter 28, in the conventional manner. That is, as is conventional in digital circuits, the signals on the leads 32A–32D will be either a logical 1 or a logical 0. The operation of the counters 24 and 28 are controlled by a clock designated generally by the reference numeral 34, and described in detail below. More specifically, the clock 34 produces an enable pulse on a lead 36 (which is connected to the counters 24 and 28) and enables the counters to count as long as the pulse is present on the lead 36. The clock 34 is also adapted to produce a reset pulse on a lead 38 (which is similarly connected to counters 24 and 28). The reset pulse resets the counters to zero.

In the example under consideration, the oscillator 18 is adapted to produce a frequency of 5,000 Hz when the temperature of 0°F. Additionally, the frequency of the oscillator increases 10 Hz for every 1°F increase of temperature. Thus, if the room is at 75°F, the oscillator 18 will produce a signal having a frequency of 5,750 Hz.

As noted below, the clock 34 produces an enable pulse of 0.1 second duration. This effectively causes the counters to divide the frequency of the oscillator 18 by a factor of 10. Thus, the counters 24 and 28 will not count the units column of the oscillator frequency. However, since the counters 24 and 28 are decade counters, they will only count the tens and hundreds columns of the oscillator frequency. In other words, the counter 28 will count the tens column of the oscillator frequency and the counter 24 will count the hundreds column of the oscillator frequency. However, since the frequency of the oscillator changes by 10 Hz for every 1°F change of temperature, it will be obvious that the counter 28 will effectively count the units column of the room temperature while the counter 24 effectively counts the tens column of the room temperature. Hence the signals on leads 30A–30D will represent the tens portion of the room temperature as binary coded decimal signals and the leads 32A–32D will represent the units column of the room temperature as binary coded decimal signals.

The clock 34 may include a square wave generator 40 which is connected to a 60 Hz source (not shown) by a lead 42. The square wave generator 40 is connected to a counter 44 that produces a 0.1 second pulse at its output terminals for every six input pulses (i.e., it divides the 60 cycle square waves by a factor of six). Connected to the output terminals of the counter 44 is a counter 46 which produces 0.1 second width pulses on leads 36 and 38 and a lead 48 in response to the leading edges of the 0.1 second pulses received at its input terminals. That is, the first two pulses received at the input terminals of the counter 46 will cause a 0.1 second width pulse (the enable pulse) to appear on the lead 36. The next pulse appearing at the input terminals of the counter 46 will cause a 0.1 second pulse (a latch pulse) to appear on the lead 48. The next signal appearing at the input terminals of the counter 46 will cause a 0.1 second pulse (the reset pulse) to appear on the lead 38. This operation is repeated periodically under the control of the 60 Hz source so that the enable, latch and reset pulses are cyclically produced.

The lead 48 that carries the latch pulse is connected to displays 50 and 52. The display 52 is also connected to the leads 30A–30D and the display 50 is connected to the leads 32A–32D. The displays 50 and 52 are conventional in construction and are operable to decode the binary coded decimals signals on the leads 30A–30D and 32A–32D and display the same as respective decimals numbers. Thus, while the counters 24 and 28 encode the frequency of the oscillator 18, the displays 50 and 52 may be thought of as decoding the information and displaying the same. The display 50 will visually indicate the units column of the temperature and the display 52 will visually indicate the tens column of the temperature. The latch pulse on the lead 48 effectively maintains the display constant during a cycle of the clock 34. That is, the displays 50 and 52 will be updated each time a latch pulse is received on the lead 48. In practice, the displays are in juxtaposition so the ambient temperature may be read easily.

The reference signal generator section 14 comprises manually presettable switches which produce a decimal number in binary coded decimal form at their output terminals. More specifically, binary switch device 54 may include a thumb wheel 56 and a display 58. Movement of the thumb wheel 56 causes a different decimal number to appear at the display 58. The decimal number is encoded by the binary switch device 54 so that the number appears in binary coded decimal format on output leads 60A–60D connected to the output terminals of the device 54. Similar comments apply to the binary switch device 62 which includes a thumb wheel 64 and a display 66. That is, the device 62 produces on leads 68A–68D the decimal number in the display 66 as binary coded decimal signals.

The binary switch devices 54 and 62 are selectively operable to be preset to the desired level of temperature in the room. (For ease of reference, the desired temperature will be referred to as the "reference" or "R" temperature. The device 62 controls the tens column of the temperature and the device 54 controls the units column of the temperature. In practice the switch devices 54 and 62 are in juxtaposition so that the reference temperature may be easily read.

The comparator section 16 comprises magnitude comparators 70 and 72. The comparators 70 and 72 are conventional in construction (which may comprise magnitude comparator model 7485 manufactured by Texas Instruments Inc.) and compare the binary coded decimal signals applied to their respective input terminals and produce output signals in accordance with the magnitude of the signals applied to their input terminals.

More specifically, leads 60A–60D are connected to one set of input terminals of the comparator 70 and 32A–32A–32D are connected to another set of input terminals of the comparator 70. The comparator 70 is provided with three output terminals respectively designated 74, 76 and 78. The comparator 70 compares the units column of the room (ambient) temperature as represented by binary coded decimals signals appearing on the leads 32A–32D with the units portion of the reference temperature as represented by the signals appearing on the leads 60A–60D. If the ambient (A) or room temperature is greater than the reference (R)

temperature a logical 1 signal will appear at the output terminal 74 (the A>R terminal). If the ambient temperature is equal to the reference temperature, a logical 1 output signal will appear at the output terminal 76 (the A=R terminal). On the other hand, if the ambient temperature is less than the reference temperature, a logical 1 signal will appear at the output terminal 78 (the A<R terminal). Normally, logical 0 signals appear at the output terminals.

Similar comments apply to the comparator 72 which compares the tens column of the temperature. Thus, leads 30A–30D are connected to one set of input terminals of the comparator 72 and leads 68A–68D are connected to the other set of input terminals. A logical 1 output signal will appear at the terminal 80 of the comparator 72 when the ambient temperature is greater than the reference temperature (the A>R terminal). When the ambient temperature is equal to the reference temperature, a logical 1 output signal will appear at output terminal 82 of the comparator 72 (the A=R terminal). On the other hand, if the ambient temperature is less than the reference temperature, a logical 1 output signal will appear at the terminal 84 of the comparator 72 (the A<R terminal).

Connected to the output terminals of the comparators 70 and 72 is a gating arrangement which ensures proper operation of the temperature changing device controlled by the thermostat 10 when the ambient temperature and the reference temperature are unequal in the desired direction. That is, for proper operation of the controlled device, the controlled device should be energized for heating purposes when the ambient temperature is less than the reference temperature and the controlled device should be energized for cooling purposes when the ambient temperature is greater than the reference temperature.

Thus, the terminals 80 and 84 of the comparator 72 are connected to terminals 86A–86B of the double-pole double-throw switch 86. The terminal 86B is connected to the terminal 86C and the terminal 86A is connected to the terminal 86D of the switch. Connected to the terminals 86E and 86F are switch armatures 86G and 86H, respectively. The armature 86G is operable to connect terminal 86E with the terminals 86A and 86C, depending on the position of the switch. On the other hand, the armature 86H is adapted to connect the terminal 86F with the terminals 86B or 86D, depending upon the position of the switch.

Connected to the terminal 86E by a lead 88 is the input terminal of an inverting amplifier 90. The output terminal of the amplifier 90 is connected to one input terminal of NAND gate N1. The other input terminal of the NAND gate N1 is connected by a lead 92 to the armature 94A of a single-pole double-throw switch 94. The armature 94A is adapted to be connected with either the terminal 94B or the terminal 94C. The terminal 94B of the switch 94 is connected to the output terminal 78 of the comparator 70 and the terminal 94C is connected to the output terminal 74 of the comparator 70. The armatures of the switches 86 and 94 are ganged together as indicated by the dashed line 96. Accordingly, the switches 86 and 94 will move as a unit so that when the switch 86 is operated to connect terminals 86E and 86F with terminals 86C and 86D, respectively, the armature 94A of the switch 94 will be connected with the terminal 94C.

The switches 86 and 94 are operable to permit the thermostat of the present invention to be used to control either a heating or a cooling device. For the position of the switches shown in FIG. 1, the thermostat will operate to raise the ambient temperature to a desired level. On the other hand, if the switches are moved to the alternate position, the thermostat will be operable to lower the temperature to a desired level.

The output terminal of NAND gate N1 is connected to the input terminal of an inverting amplifier 98. The output terminal of the amplifier 98 is connected to the input terminal of an AND gate A1. Connected to the input terminal of an AND gate A2 by a lead 100 is the terminal 86F of the switch 86. The output terminals of the AND gates A1 and A2 are connected to the input terminals of a NOR gate NR1. The output terminal of gate NR1 is connected to the input terminal of an inverting amplifier 102, the output terminal of which is connected to a junction 104 by a lead 106. Connected to the junction 104 is the input terminal of a time delay device 108 and the input terminal of an AND gate A3. Connected to another terminal of the gate A3 is the output terminal of the delay device 108. The output terminal of the gate A3 is connected by a lead 110 to the controlled device so that a signal appearing on the lead 110 will operate the controlled device, such as a furnace, to cause the ambient temperature to rise in accordance with the example under consideration. The delay of the device 108 is selected so that the period of delay will be slightly in excess of the interval of the enable pulse produced by the clock 34. This ensures that the thermostat counting circuits will have reached an equilibrium state before a signal is produced on the lead 110. That is, the delay device 108 prevents the production of the operate signal on the lead 110 during the counting operation.

In operation, it will be assumed that the switches 86 and 94 are set for a heating condition and are in the position shown in FIG. 1. It will further be assumed that the reference signal generator comprising the switch devices 62 and 54 will be set for a reference temperature of 72°F. Additionally, for purposes of illustration, it will be assumed that the ambient or room temperature is 70°F and therefore below the reference temperature, thereby requiring operation of the furnace or heater.

Accordingly, the oscillator 18 will produce an output frequency of 5,700 Hz. Immediately after the enable pulse on the lead 36, the decade counter 24 will register a count of 7 in binary coded decimal format and the decade counter 28 will register a count of 0 in binary coded decimal format. The latch pulse appearing on lead 48 will therefore cause the decimal 7 to be displayed by the display 52 and the decimal number 0 to be displayed by the display 50 thereby visually indicating to the operator the ambient temperature.

Since the binary switch device 62 and the counter 24 will produce signals or voltage patterns representing the decimal number 7 in binary coded format, an output signal will only appear at the terminal 82 thereby indicating that the tens column of the ambient temperature is equal to the tens column of the reference temperature. However, the binary signals applied to the comparator 70 which represent the reference temperature will be greater than the binary signals applied to the comparator 70 from the counter 28 which represent the ambient temperature. Accordingly, an output signal will appear at the terminal 78 since the units column of the ambient or room temperature will be less than the units column of the reference temperature (i.e., A<R). Accordingly, a logical 1 signal will be applied to the input terminal of the NAND gate N1 via the lead 92. Since a logical 0 signal is applied to the input terminal of the inverting amplifier 90, the output signal from the inverting amplifier will similarly be a logical 1 signal.

Accordingly, the NAND gate N1 will therefore produce a logical 0 signal which will be inverted to become a logical 1 signal via the inverting amplifier 98 so that a logical 1 signal is applied to gate A1. Since a logical 0 signal appears on the lead 100, a logical 1 signal from the gate A1 will be applied to NOR gate NR1 and a logical 0 signal will be applied to gate NR1 via the gate A2. Thus, NOR gate NR1 will produce a logical 0 signal at its output terminals and the inverting amplifier 102 will therefore produce a logical 1 signal at its output terminals. Hence, the delay device 108 will be triggered and, after the elapsed time interval, a logical 1 signal will be produced by the delay device 108 and applied to the input terminal of the AND gate A3. Accordingly, since logical 1 signals are applied to both terminals of the AND gate A3, a signal will be produced on the lead 110 to cause operation of the associated controlled device.

The lead 110 may, for example, be connected to a relay having a time delay release which is greater than a cycle of operation of the clock 34 so that the relay will not release until a signal has been absent from the lead 110 for a period greater than a cycle of operation. This will prevent release of the relay during a counting interval, for example.

When the ambient temperature reaches the reference temperature, the logical 1 signal of the output terminal 78 will become a logical 0 signal. Thus, the NAND gate N1 will thereby produce a logical 1 signal at its output terminal which is inverted to become a logical 0 signal applied to the AND gate A1. Thus, both AND gates A1 and A2 apply logical 0 signals to NOR gate NR1 thereby causing a logical 1 signal to be applied to the input terminal of the amplifier 102. The amplifier will then produce a logical 0 signal at its output terminals so that no signal will appear on the lead 110.

A similar analysis shows that for any ambient temperature greater than the reference temperature, no signal will be produced on the lead 110. For example, as long as the tens column of the ambient and reference temperatures are equal, a logical 0 signal will be appled to the NAND gate N1 via the lead 92. As long as the units column of the ambient temperature is equal to or greater than the reference temperature units column a logical 0 will appear on lead 92 and no signal will appear on the lead 110. On the other hand, assuming that the tens portion of the ambient temperature is greater than the tens portion of the reference temperature (thereby indicating that the room temperature is greater than the reference temperature) a logical 1 signal will be applied to the input terminal of the inverting amplifier 90 via: the output terminal 80 of the comparator 72, the switch 86 and the lead 88. Therefore, the amplifier 90 will apply a logical 0 signal to the input terminal of the NAND gate N1 connected thereto. Hence, regardless of the signal applied to the other input terminal of the NAND gate N1, a logical 1 signal will appear at the output terminals thereof. As noted above, as long as a logical 1 signal appears at the output terminals of the NAND gate N1 and a logical 0 signal appears at the output terminals of the AND gate A2, no signal will be produced on the lead 110.

On the other hand, if the value of the tens column of the ambient temperature drops below that of the tens column of the reference temperature, a logical 1 signal will appear at the output terminal 84 of the comparator 72 (i.e., A<R terminal). This signal will be applied to the AND gate A2 which, in turn, will apply a logical 1 signal to the input terminal of the NOR gate NR1. The gate NR1 will therefore produce a logical 0 signal at its output terminals and, as indicated above, a logical 0 signal applied to the input terminals of the amplifier 102 will cause a signal to be produced on the lead 110 thereby operating the heater or furnace. Moreover, as will be obvious from a consideration of the circuits thus far described, a logical 1 signal applied to the AND gate A2 will always cause a signal to appear on the lead 110 regardless of the type of signal applied to the NAND gate N1 via the lead 92.

In many cases, it is desirable to produce an indication if the temperature reaches an extreme level. For example, a temperature in the 90°F range may be considered to be an overload condition which may be produced by a malfunction in the heater If the home is unoccupied and the condition permitted to exist, serious damage may result. In order to eliminate this possibility, the thermostat of the present invention further includes an overload comparator 112 connected to the tens counters 24 via the leads 30A–30D. The other input of the comparator 112 may be connected to a binary switch device (not shown) which is set to produce the number 9 in binary coded decimal form. Thus, the comparator 112 will produce an alarm signal on an output lead 114 when the input signals indicate decimal number 9. The signal on the lead 114 may then be utilized to disable the heater.

When it is desired to utilize the thermostat 10 for cooling purposes, the switches 86 and 94 are operated so that terminal 86E is connected with the terminal 86C and the terminal 86B is connected with the terminal 86D. Additionally, the armature 94A will engage the contact 94C. An analysis similar to that above will illustrate that a signal will only be produced on the lead 110 when the ambient temperature is greater than the reference temperature. For example, if the reference temperature is set for 72°F and the ambient temperature is 78°F, logical 1 signal will be produced at the output terminal 74 (i.e., A>R). Since the lead 88 now is connected to the terminal 86B, a logical 0 signal is applied to the input terminals of the amplifier 90 thereby resulting in a logical 1 signal being applied to the input terminal of the NAND gate N1 connected thereto. Similarly, a logical 1 signal is applied to gate N1 via lead 92 which is now connected to the A>R terminal of comparator 70. Thus, the NAND gate N1 will produce a 0 output signal which, in effect, causes a logical 1 signal to be applied to the input terminal of the gate NR1 via the AND gate A1. Since the AND gate A2 produces a logical 0 input signal, the NOR gate NR1 will similarly produce a logical 0 signal at its output terminals. Hence, the amplifer 102 will produce logical 1 signal and a signal will appear on lead 110 thereby operating the cooling unit. If the ambient temperature rises into the 80°F range, a logical 1 signal will be applied to gate A2 from terminal 80 (i.e., A>R). As noted above, a logical 1 signal applied to gate A2 and thereby to gate NR1 will always cause a signal to be produced on the lead 110.

On the other hand, if the temperature drops into the 60°F range, a logical 0 signal appears at gate A2. Moreover, a logical 0 signal appears at the output terminals of amplifier 90 thereby causing a logical 0 signal to appear at gate A1 regardless of the signal produced by comparator 70. Hence, as long as the tens column of the ambient temperature is less than the tens column of the reference temperature, no signal appears on lead 110.

When the thermostat 10 is operated as a cooling device, the overload comparator 112 may still be utilized by setting the binary switch device so that the number therein represents a minimum cooling temperature such as, for example, 5. Thus, if the ambient temperature drops into the 50°F range, an alarm signal will be applied to the lead 114.

Accordingly, an electronic thermostat has been disclosed which is simple in construction and reliable in operation and which maintains a high accuracy over its range of operation.

In many cases, it may be desirable to permit a specific differential in temperature to occur between the ambient or room and the reference temperature before an operate signal is produced on the lead 110. To be more specific, if the heating or cooling unit is operated for a 1°F difference between ambient and reference temperatures, the duty cycle of the operated device will be extremely high. For this reason, it is desirable to introduce a differential of, for example, 3° before the associated device is operated to bring the ambient temperature to the desired level. Thus, FIG. 2 illustrates a circuit which may be used in conjunction with the circuit of FIG. 1 to produce such differential in a specific decade range.

Thus, the differential circuit is designated generally by the reference numeral 116 in FIG. 2 and comprises an adder 118 that is connected to the units counter 28 via the leads 32A-32D. A differential incrementor 120 is provided which may comprise a set of binary switches similar to the binary switch device 54. The differential incrementor is set for the specific difference in temperature desired before the output signal appears on the lead 110. In the example under consideration, it is assumed that the incrementor is set for the decimal number 3 so that the incrementor 120 will produce the number 3 in binary coded decimal format on the output leads 122A-122D. Thus, the output signal appearing on leads 124A-124D will be the sum of the numbers from counter 28 and the incrementor 120 in binary coded decimal notation. These output leads are connected to one set of input terminals of a comparator 126. The other input terminals of the comparator 126 are connected to the binary switch device 54 via the leads 160A-160D.

The comparator includes an output terminal 128 and, as is conventional, means within the comparator produces a logical 1 signal at the terminal 128 if the encoded number at the output terminals of the adder 118 is smaller than the encoded reference number on the leads 60A-60D. In other words, a logical 1 signal will be produced at the output terminal 28 of the comparator only if the reference termperature is greater than the sum of the ambient temperature and the differential increment. (Again, this circuitry assumes that the thermostat is set for a heating operation. If instead the thermostat is utilized for a cooling operation, a logical 1 signal produced when the reference temperature is smaller than the sum of the ambient temperature plus the differential increment would be used.)

The terminal 128 is connected to the set input terminal of a JK flip-flop or bistable multivibrator FF1 by a lead 130. The reset terminal of flip-flop FF1 is connected to terminal 76 (the A=R terminal) of comparator 70 (the units comparator) of the circuit of FIG. 1. The 1 output terminal of FF1 is connected to an input terminal of a NAND gate N2. The other input terminal of the gate N2 is connected to the output terminal of the amplifier 102 of FIG. 1 by the lead 106. In other words, when utilizing the differential circuit 116 of FIG. 2, the lead 106 of the circuit of FIG. 1 is disconnected from the junction 104 and is connected to the other input terminal of the NAND gate N2. The output terminal of the NAND gate N2 is connected to the input terminal of an inverting amplifier 132, the output terminals of which are connected to the junction 104 via a lead 134.

In operation it will be assumed that reference temperature is set for 75°F and that the differential incrementor 120 is set for a difference of 3°. Accordingly, assuming that the temperature of the room or the ambient temperature is 72°F, the decimal number 2 in binary coded decimal format will be applied to the adder 118 via leads 32A-32D and the number 3 in binary coded decimal format (i.e., or a pattern of voltages) will be applied to the adder via the leads 122A-122D. Accordingly, the decimal number 5 in binary coded format will be applied to the comparator 126 via the leads 124A-124D. The same signals will be applied to the comparator via the leads 60A-60D and accordingly, a logical 0 signal will appear at the output terminal 128. Hence, no further action will take place and no signal will appear on the lead 110.

It will be obvious from a consideration of the foregoing, that if the ambient temperature is greater than 72°F, no logical 1 signal will appear on lead 130 and, therefore, no signal will appear on lead 110.

However, if the ambient temperature drops to 71°F, the decimal number represented by the binary coded notation on the leads 124A-124D will indicate a 4. Since the reference numberal 5, a logical 1 signal will appear at the output terminal 128 thereby setting the flip-flop FF1. Hence, a logical 1 signal will appear at the input terminal to the NAND gate N2 connected thereto. Additionally, since the ambient temperature is less than the reference temperature a logical 1 signal will also appear on the lead 106 from amplifier 102. Thus, the output terminals of the gate N2 will produce a logical 0 signal which will appear as a logical 1 signal on the lead 134 via amplifier 132. Since the lead 134 is connected to the junction 104, a signal will now appear on the lead 110 thereby causing the heating element to operate.

Thus, a circuit has been disclosed which is operable to introduce a difference of a desired magnitude before operation of the controlled device.

In many cases it is desirable to control the temperature of the object to be monitored from a remote point. In those cases the reference signal generator may be located at the remote point while the thermister is located in heat-exchanging relationship with the object (i.e., the room in the present example). However, it may be desirable to control the temperature of the room from a plurality of remote points and/or from the room proper. For example, during day hours it may be desirable to control the temperature of the room from a reference signal generator located in the room. However, at night it may be desirable to control the temperature of the room from a remote point. Thus, if the controlled room is a playroom or a living room, the temperature of the room may be lowered at night and raised during the day from a remote point such as the bedroom.

Accordingly, FIG. 3 illustrates a circuit which permits control of the temperature of a room from a plurality of reference signal generators. Thus, a switch 136 is provided that is serially connected between reference signal generator 14 and the comparators 70 and 72 via the leads 60A–60D and 68A–68D (shown in FIG. 3 as repective cables). Additionally, a reference signal generator 214, identical in construction to the generator 14, is provided. The generator 214 is similarly adapted to be connected by the switch 136 to the comparator 70 and 72 via the respective leads 60A–60D and 68A–68D. Switch 136 may be of the rotary wafer type of conventional construction having a plurality of decks and is operable to selectively connect generator 14 or 215 or both to the comparators 70 and 72 via the leads 60A–60D and 68A–68D depending on the position of the switch.

In operation, during the daytime, the switch 136 may be operated so that reference signal generator 14 is connected to comparators 70 and 72 via the leads 60A–60D and 68A–68D, respectively, and the generator 214 disconnected therefrom. The thermostat will therefore operate in the manner described in connection with the description of FIG. 1, or if the differential circuit is used, in the manner described in connection with the description of FIG. 2. If it is desired to override the reference signal generator 14 from a remote location by lowering or raising the reference temperatures, the switch 136 may be operated to connect the reference signal generator 214 to the comparators 70 and 72 and to disconnect the generator 14 therefrom. Accordingly, thermostat 10 will now operate in the same manner as described hereinabove but based upon the setting of the generator 214 as the reference temperature rather than the setting of generator 14.

While preferred embodiments of the invention have been disclosed herein, it will become obvious that numerous omissions, changes and additions may be made in such embodiments without departing from the spirit and scope of the present invention.

What is claimed is:

1. A digitally-operated thermostat for controlling the operation of an associated temperature changing device to maintain the temperature of an object at a desired level, comprising: digital temperature signal generating means in heat exchanging relationship with said object for generating a temperature signal comprising a pattern of voltage levels representative of the temperature of said object in binary coded decimal form, digital reference signal generating means adapted to be operated to produce a reference signal comprising a pattern of voltage levels representative of said desired level in binary coded decimal form, and digital comparing means responsive to pattern differences between said patterns of voltage levels representing said object temperature and said desired temperature when said pattern difference represents a difference in only one direction with respect to said desired level for producing an operate signal to cause operation of said temperature changing device, said temperature signal generating means comprising a variable frequency oscillator, said oscillator having a temperature sensor adapted to be placed in heat exchanging relationship with the object for varying the frequency of said oscillator as a function of the temperature of said object, counting means connected to said oscillator for encoding the frequency of said oscillator as binary coded decimal signals to provide said temperature signals, and clock means for cyclically resetting and enabling said counting means for a preselected interval of time in each cycle.

2. Temperature control apparatus as in claim 1, in which said digital comparing means is operable to produce said operate signal when said desired temperature is greater than said ambient temperature, and manually operable reversing means for reversing the operation of said comparing means whereby said comparing means generates said operate signal when said ambient temperature is greater than said desired temperature.

3. Temperature control apparatus as in claim 1, and digital differential means connected to said comparing means for preventing generation of said operate signal until said pattern difference is representative of a temperature differential greater than a preselected temperature differential.

4. A thermostat as in claim 1, in which said reference signal generating means comprises selectively variable presettable temperature means for producing a plurality of digital reference signals corresponding to different temperature values.

5. A thermostat as in claim 1, in which said counting means comprise decade counters for counting unit and tens increments.

6. A thermostat as in claim 1, and display means connected to said counting means and responsive to said binary coded decimal signals for numerically displaying the ambient temperature.

7. A thermostat as in claim 1, in which said comparing means comprises time delay means for delaying the production of said operate signal for a period of time in excess of said preselected interval of time.

8. A thermostat as in claim 1, wherein said comparing means comprises a comparator for comparing the binary coded decimal signals produced by said temperature signal generating means with the binary coded decimal signals produced by said reference signal generating means, at least a pair of output terminals connected to said comparator, means in said comparator for applying an output signal to one of said output terminals when the temperature signal is greater than the reference signal and for applying an output signal to the other of output terminals when said reference signal is greater than said temperature signal, gate means responsive to said comparator output signal for producing said operate signal, and switch means for selectively connecting said gate means to a selected one of said pair of output terminals.

9. A thermostat as in claim 8, in which said gate means comprises a detection stage for detecting said output signal and an output stage for generating said operate signal when energized, and differential means connected between said detection and output stages for energizing said output stage when said ambient temperature differs from said reference temperature by a preselected difference.

10. A thermostat as in claim 1, in which said clock means comprises a pulse generator for cyclically generating an enable pulse to enable said counters to count, and for generating a reset pulse at the end of each cycle for resetting said counters to zero.

11. A thermostat as in claim 1, and overload means connected to said counting means responsive to a predetermined binary coded decimal number for generating an overload signal, whereby an overload condition is indicated.

* * * * *

UNITED STATES PATENT OFFICE
CERTIFICATE OF CORRECTION

PATENT NO. : 3,942,718
DATED : March 9, 1976
INVENTOR(S) : Joseph M. Palmieri

It is certified that error appears in the above-identified patent and that said Letters Patent are hereby corrected as shown below:

Col. 4, line 59, change "32A-32A-32D" to --32A-32D--;
Col. 11, line 14, change "repective" to --respective--;
Col. 12, line 4, after "object," insert --said oscillator providing an output directly to a--;
       line 5, delete "connected to said oscillator";
       line 8, after "means" insert --directly connected to said counting means--.

Signed and Sealed this eighth Day of June 1976

[SEAL]

Attest:

RUTH C. MASON
Attesting Officer

C. MARSHALL DANN
Commissioner of Patents and Trademarks